US008587468B2

(12) United States Patent
Card et al.

(10) Patent No.: US 8,587,468 B2
(45) Date of Patent: Nov. 19, 2013

(54) METHOD, SYSTEM AND PROGRAM PRODUCT FOR DEINTERLEAVING AND CLASSIFYING ARBITRARY RADAR PULSE PATTERNS USING NON-DETERMINSITIC FINITE STATE AUTOMATA

(75) Inventors: Michael Patrick Card, Syracuse, NY (US); Paul Guy Springer, Manlius, NY (US)

(73) Assignee: SRC, Inc., North Syracuse, NY (US)

( * ) Notice: Subject to any disclaimer, the term of this patent is extended or adjusted under 35 U.S.C. 154(b) by 129 days.

(21) Appl. No.: 13/099,755

(22) Filed: May 3, 2011

(65) Prior Publication Data
US 2012/0280848 A1 Nov. 8, 2012

(51) Int. Cl.
*G01S 7/36* (2006.01)

(52) U.S. Cl.
USPC ............... 342/13; 342/20; 342/175; 342/195

(58) Field of Classification Search
USPC ........................................ 342/13, 20, 40, 195
See application file for complete search history.

(56) References Cited

U.S. PATENT DOCUMENTS

| 4,721,958 | A | 1/1988 | Jenkin |
| 4,879,561 | A | 11/1989 | Inkol |
| 4,918,455 | A | 4/1990 | Maier |
| 5,457,460 | A | 10/1995 | Tran et al. |
| 5,563,806 | A | 10/1996 | Barry et al. |
| 5,583,505 | A | 12/1996 | Andersen et al. |
| 6,696,879 | B1 * | 2/2004 | O'Toole et al. ............. 327/356 |
| 6,788,243 | B2 | 9/2004 | Lavoie |
| 6,985,102 | B1 * | 1/2006 | Horn et al. ..................... 342/13 |
| 7,034,738 | B1 * | 4/2006 | Wang et al. ..................... 342/13 |
| 7,362,257 | B2 | 4/2008 | Bruzzone et al. |
| 7,397,415 | B1 * | 7/2008 | Wang et al. ..................... 342/13 |
| 7,411,539 | B2 | 8/2008 | Valand |
| 7,570,193 | B2 * | 8/2009 | Bagge .............................. 342/20 |
| 7,657,588 | B2 | 2/2010 | Sirois |
| 7,830,297 | B1 * | 11/2010 | Wang et al. ..................... 342/13 |
| 2003/0099210 | A1 * | 5/2003 | O'Toole et al. ............... 370/311 |

(Continued)

OTHER PUBLICATIONS

Piyachon, P.; Yan Luo; , "Compact State Machines for High Performance Pattern Matching," Design Automation Conference, 2007. DAC '07. 44th ACM/IEEE, vol., No., pp. 493-496, Jun. 4-8, 2007 URL: http://ieeexplore.ieee.org/stamp/stamp.jsp?tp=&arnumber=4261234&isnumber=4261114.*

(Continued)

*Primary Examiner* — John B Sotomayor
*Assistant Examiner* — Marcus Windrich
(74) *Attorney, Agent, or Firm* — George R. McGuire; Bond Schoeneck & King, PLLC (57) ABSTRACT

A method, a system and a program product for deinterleaving and classifying an incoming unknown radar pulse pattern uses a library of state machines that mesh with a library of known radar pulse patterns of a library of known radar emitter sources. A continuous sequence of radar pulse descriptor words is secured for the incoming unknown radar pulse pattern and a plurality of state machines that may mesh with the continuous sequence of radar pulse descriptor words is selected from the library of state machines. The plurality of state machines that may mesh with the incoming unknown radar pulse pattern is operated upon the incoming unknown radar pulse pattern. Radar emitter sources that correlate with state machines that actually mesh with the incoming unknown radar pulse pattern are designated as radar emitter sources that comprise the incoming unknown radar pulse pattern.

22 Claims, 5 Drawing Sheets

(56) References Cited

U.S. PATENT DOCUMENTS

| | | | | |
|---|---|---|---|---|
| 2006/0132348 | A1* | 6/2006 | Valand | 342/13 |
| 2009/0135052 | A1* | 5/2009 | Driggs et al. | 342/195 |
| 2010/0019948 | A1* | 1/2010 | Newham et al. | 342/20 |
| 2013/0009837 | A1* | 1/2013 | Alexopoulos et al. | 343/843 |

OTHER PUBLICATIONS

Piyachon, P.; Yan Luo, "Compact State Machines for High Performance Pattern Matching," Design Automation Conference, 2007. DAC '07. 44th ACM/IEEE , vol., No., pp. 493,496, Jun. 4-8, 2007.*
Cantin et al., "Implementation of the Fuzzy Art Neural Network for Fast Clustering of Radar Pulses.", Proceedings of the 1998 IEEE International Symposium on Circuits and Systems [Online] 1998.
Gauvin et al., "Enabling Technology: Radar PRI and RF Prediction.", MC Countermeasures Inc. [Online] 2005.
Granger et al., "A Comparison of Self-Organizing Neural Networks for Fast Clustering of Radar Pulses.", Signal Processing [Online] 1998, Vol. 64, Issue 3, pp. 249-269.
Granger et al., "A What-and-Where Fusion Neural Network for Recognition and Tracking of Multiple Radar Emitters." Neural Networks [Online] 2001, vol. 14, Issue 3, pp. 325-344.
Liu et al., "A New Pulse Deinterleaving Algorithm Based on Multiple Hypothesis Tracking.", International Radar Conference—Surveillance for a Safer World [Online] 2009.
Shieh et al., "A Vector Neural Network for Emitter Identification.", IEEE Transactions on Antennas and Propagation [Online] 2002, pp. 1120-1127.
International Search Report Form PCT/ISA/220, International Application No. PCT/US2012/036314/pp. 1-10.

* cited by examiner

Fig. 2

| TOA | RF | PD | FMOP |

TOA = TIME OF ARRIVAL, INTEGER COUNT OF MICROSECONDS IS A TYPICAL FORMAT
RF = RADIO FREQUENCY (COMMONLY IN MHz)
PD = PULSE DURATION (USUALLY MICROSECONDS OR NANOSECONDS)
FMOP = FREQUENCY MODULATION ON PULSE, OFTEN MHz / MICROSECOND

Fig. 3

CCDM CLASSIFICATION

```
SELECT_PULSE_PATTERN P1 (114) WHERE
                                        PPDL
 P1:
    {PD_SEQ: (MIN:0.4, NOM:0.5, MAX:0.6, us)}
    {FMOP_SEQ: (MIN:0.0, NOM:0.0, MAX:0.0, MHz_per_s) }
    {RF_MOD: MOD_TYPES:SINUSOID,
     MODULATION_FREQUENCY: (MIN:15.29, NOM:15.30, MAX: 15.31, Hz)
     MODULATION_AMPLITUDE: (MIN:47.4, NOM:47.5, MAX: 47.6, MHz)
     MODULATION_CENTER_VALUE: (MIN:9097.4, NOM:9097.5, MAX: 9097.6,MHz)
     SAMPLE_PERIOD:575.0,us}
    {PRI_MOD: MOD_TYPE:SINUSOID,
     MODULATION_FREQUENCY: (MIN:199.0, NOM:200.0, MAX: 201.0, Hz)
     MODULATION_AMPLITUDE: (MIN:74.0, NOM:75.0, MAX: 76.0, us)
     MODULATION_CENTER_VALUE: (MIN:574.0, NOM:575.0, MAX:576.0, us}
     SAMPLE_PERIOD:575.0,us};
 WITHIN 66000 us;
```

Fig. 5B

```
SELECT_PULSE_PATTERN P1 (114) WHERE
                                        PPDL
 P1:
    {PD_SEQ: (MIN:0.4, NOM:0.5, MAX:0.6, us)}
    {FMOP_SEQ: (MIN:0.0, NOM:0.0, MAX:0.0, MHz_per_s) }
    {RF_MOD: MOD_TYPES:SINUSOID,
     MODULATION_FREQUENCY: (MIN:15.29, NOM:15.30, MAX: 15.31, Hz)
     MODULATION_AMPLITUDE: (MIN:47.4, NOM:47.5, MAX: 47.6, MHz)
     MODULATION_CENTER_VALUE: (MIN:9097.4, NOM:9097.5, MAX: 9097.6,MHz)
     SAMPLE_PERIOD:575.0,us}
    {PRI_MOD: MOD_TYPE:SINUSOID,
     MODULATION_FREQUENCY: (MIN:199.0, NOM:200.0, MAX: 201.0, Hz)
     MODULATION_AMPLITUDE: (MIN:74.0, NOM:75.0, MAX: 76.0, us)
     MODULATION_CENTER_VALUE: (MIN:574.0, NOM:575.0, MAX:576.0, us}
     SAMPLE_PERIOD:575.0,us};
 WITHIN 66000 us;
```

SPECIFY PARAMETERS

Fig. 5C

```
SELECT PULSE_PATTERN P1 (114) WHERE
P1: {PD_SEQ: (MIN:0.4, NOM:0.5, MAX:0.6, us)}
    {FMOP_SEQ: (MIN:0.0, NOM:0.0, MAX:0.0, MHz_per_s)}
    {RF_MOD: MOD_TYPE:SINUSOID,       ← SPECIFY MODULATION
            MODULATION_FREQUENCY: (MIN:15.29, NOM:15.30, MAX: 15.31, Hz)
            MODULATION_AMPLITUDE: (MIN:47.4, NOM:47.5, MAX: 47.6, MHz)
            MODULATION_CENTER_VALUE: (MIN:9097.4, NOM:9097.5, MAX:9097.6,MHz)
            SAMPLE_PERIOD:575.0,us}
    {PRI_MOD: MOD_TYPE:SINUSOID,
            MODULATION_FREQUENCY: (MIN:199.0, NOM:200.0, MAX: 201.0, Hz)
            MODULATION_AMPLITUDE: (MIN:74.0, NOM:75.0, MAX: 76.0, us)
            MODULATION_CENTER_VALUE: (MIN:574.0, NOM:575.0, MAX:576.0, us)
            SAMPLE_PERIOD:575.0,us}
WITHIN 66000 us;
```

Fig. 5D

```
SELECT PULSE_PATTERN P1 (114) WHERE
P1: {PD_SEQ: (MIN:0.4, NOM:0.5, MAX:0.6, us)}    ← SPECIFY SINGLE
    {FMOP_SEQ: (MIN:0.0, NOM:0.0, MAX:0.0, MHz_per_s)}   OR MULTI-VALUE
    {RF_MOD: MOD_TYPE:SINUSOID,                          SEQUENCES
            MODULATION_FREQUENCY: (MIN:15.29, NOM:15.30, MAX: 15.31, Hz)
            MODULATION_AMPLITUDE: (MIN:47.4, NOM:47.5, MAX: 47.6, MHz)
            MODULATION_CENTER_VALUE: (MIN:9097.4, NOM:9097.5, MAX:9097.6,MHz)
            SAMPLE_PERIOD:575.0,us}
    {PRI_MOD: MOD_TYPE:SINUSOID,
            MODULATION_FREQUENCY: (MIN:199.0, NOM:200.0, MAX: 201.0, Hz)
            MODULATION_AMPLITUDE: (MIN:74.0, NOM:75.0, MAX: 76.0, us)
            MODULATION_CENTER_VALUE: (MIN:574.0, NOM:575.0, MAX:576.0, us)
            SAMPLE_PERIOD:575.0,us}
WITHIN 66000 us;
```

METHOD, SYSTEM AND PROGRAM PRODUCT FOR DEINTERLEAVING AND CLASSIFYING ARBITRARY RADAR PULSE PATTERNS USING NON-DETERMINSITIC FINITE STATE AUTOMATA

BACKGROUND OF THE INVENTION

1. Field of the Invention

The invention relates generally to analysis of radar pulse patterns. More particularly, the invention relates to deinterleaving and classifying of complex radar pulse patterns that may derive from multiple radar emitter sources.

2. Technical Background

Radar systems are commonly utilized in military and commercial applications for purposes of detecting and tracking radar targets within a particular radar field of interest. In particular within military applications, radar systems are often utilized to detect and track avionic targets within a particular avionic field of interest. Thus, within the context of a particular avionic field of interest, a particular avionic target, which may for example include a military aircraft, may be subject to detection and tracking by a plurality of radar emitter sources. The plurality of radar emitter sources may include terrestrial radar emitter sources and airborne radar emitter sources, as well as benign radar emitter sources and hostile radar emitter sources.

Given the possibility that hostile radar emitter sources may detect and track a military target for purposes of destruction of that military target, it becomes desirable to efficiently and accurately identify multiple indeterminate radar emitter sources that may be used for detecting and tracking a particular military radar target within a particular military radar field of interest.

Unfortunately, the accurate identification of multiple indeterminate radar emitter sources is often not readily achievable insofar as multiple indeterminate radar emitter sources may in an aggregate yield a particularly complex radar pulse pattern that may in turn be detected by a particular military target of interest.

Thus, desirable are methods and systems for deinterleaving and classifying complex radar pulse patterns incident upon a particular radar target that result from detection and tracking of the particular radar target by multiple radar emitter sources.

SUMMARY OF THE INVENTION

The invention is embodied within the context of a method, a system and a program product for deinterleaving and classifying a complex radar pulse pattern that typically derives from a plurality of radar emitter sources that may impinge upon a particular radar target.

The particular method, system and program product in accordance with the embodiments include development of a library of known radar emitter sources and a corresponding library of state machines that mesh with a plurality of known radar pulse patterns for the library of known radar emitter sources.

Then secured within the context of an incoming unknown radar pulse pattern is a continuous sequence of radar pulse descriptor words that describe the incoming unknown radar pulse pattern. The continuous sequence of radar pulse descriptor words is evaluated while using an application software program to continuously select from the library of state machines a plurality of state machines that may mesh with the incoming unknown radar pulse pattern. The plurality of state machines that may mesh with the incoming unknown radar pulse pattern is then operated upon the incoming unknown radar pulse pattern. The radar emitter sources that correlate with state machines that actually mesh with the incoming unknown radar pulse pattern are designated as radar emitter sources that comprise the incoming unknown radar pulse pattern.

Additional unmeshed portions of the incoming unknown radar pulse pattern are designated as "new" radar pulse patterns from "new" radar emitter sources, and new state machines are developed to mesh with those additional unmeshed portions of the incoming unknown radar pulse pattern. These new radar pulse patterns for the new radar emitter sources, and the corresponding new state machines, are newly incorporated into the library of state machines that mesh with the library of known radar pulse patterns for the library of known radar emitter sources. The foregoing "new" radar pulse patterns and correlating "new" radar emitter sources may derive from: (1) previously undetected radar emitter sources; (2) radar emitter sources that have been previously detected but not characterized in any library of radar emitter sources and radar pulse patterns; or alternatively (3) radar emitter sources that have been characterized in some available library of radar emitter sources and radar pulse patterns, but not apparently included in a library of radar emitter sources and radar pulse patterns within the context of the instantly embodied or inventive radar pulse pattern detecting, deinterleaving and classification platform.

Thus, in accordance with the foregoing summary, a plurality of radar emitter sources that comprises an incoming unknown radar pulse pattern incident upon a radar target may be deinterleaved and classified by meshing with particular state machines from a plurality of state machines from a library of state machines that correlate with a library of known radar pulse patterns for a library of known radar emitter sources The particular methodology in accordance with the embodiments thus provides a concurrent deinterleaving and classifying of the incoming unknown radar pulse pattern, to efficiently provide for determination of a plurality of radar emitter sources that comprise the incoming unknown radar pulse pattern.

A particular method for deinterleaving and classifying a radar pulse pattern in accordance with the embodiments includes developing a library of state machines for a library of known radar pulse patterns for a library of known radar emitter sources. The particular method also includes securing continuously for an incoming unknown radar pulse pattern a sequence of pulse descriptor words that describes the incoming unknown radar pulse pattern. The particular method also includes determining continuously from the library of state machines for each pulse descriptor word within the sequence of pulse descriptor words a plurality of state machines that may mesh with the incoming unknown radar pulse pattern. The particular method also includes operating continuously and simultaneously the plurality of state machines that may mesh with the incoming unknown radar pulse pattern to determine which state machines from the plurality of state machines actually mesh with the incoming unknown radar pulse pattern. The particular method also includes designating from the state machines that actually mesh with the incoming unknown radar pulse pattern the corresponding known radar emitter sources as comprising the incoming unknown radar pulse pattern.

A particular system for deinterleaving and classifying a radar pulse pattern in accordance with the embodiments includes a computer programmed to: (1) develop a library of state machines for a library of known radar pulse patterns for a library of known radar emitter sources; (2) secure continuously for an incoming unknown radar pulse pattern a sequence of pulse descriptor words that describes the incoming unknown radar pulse pattern; (3) determine continuously from the library of state machines for each pulse descriptor word within the sequence of pulse descriptor words a plurality of state machines that may mesh with the incoming unknown radar pulse pattern; (4) operate continuously and simultaneously the plurality of state machines that may mesh with the incoming unknown radar pulse pattern to determine which state machines from the plurality of state machines actually mesh with the incoming unknown radar pulse pattern; and (5) designate from the state machines that actually mesh with the incoming unknown radar pulse pattern the corresponding known radar emitter sources as comprising the incoming unknown radar pulse pattern.

A particular computer program product in accordance with the embodiments includes a tangible machine readable medium encoded with instructions to: (1) develop a library of state machines for a library of known radar pulse patterns for a library of known radar emitter sources; (2) secure continuously for an incoming unknown radar pulse pattern a sequence of pulse descriptor words that describes the incoming unknown radar pulse pattern; (3) determine continuously from the library of state machines for each pulse descriptor word within the sequence of pulse descriptor words a plurality of state machines that may mesh with the incoming unknown radar pulse pattern; (4) operate continuously and simultaneously the plurality of state machines that may mesh with the incoming unknown radar pulse pattern to determine which state machines from the plurality of state machines actually mesh with the incoming unknown radar pulse pattern; and (5) designate from the state machines that actually mesh with the incoming unknown radar pulse pattern the corresponding known radar emitter sources as comprising the incoming unknown radar pulse pattern.

Within the context of the embodiments and the invention, "securing" the continuous sequence of radar pulse descriptor words that continuously describe an incoming unknown radar pulse pattern may be effected: (1) as an integral operation of the embodied method, system and program product; or (2) alternatively this particular limitation of the embodied method, system and program product may be undertaken separately and the particular sequence of radar pulse descriptor words may be effectively independently received or obtained within the context of the embodied and inventive method, system and program product.

BRIEF DESCRIPTION OF THE DRAWINGS

The embodiments, which include a method, a system and a program product for deinterleaving and classifying an incoming unknown radar pulse pattern to provide a plurality of known radar emitter sources that comprise the incoming unknown radar pulse pattern, is understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

The embodiments, which include a method, a system and a program product for deinterleaving and classifying an incoming unknown radar pulse pattern to provide a plurality of known radar emitter sources that comprise the incoming unknown radar pulse pattern, is understood within the context of the description set forth below. The description set forth below is understood within the context of the drawings described above.

The use of the terms "a," "an" and "the," and similar referents in the context of describing the embodiment and the invention (especially in the context of the following claims) is to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected" is to be construed as partly or wholly contained within, attached to, or joined together, even if there is something or some element intervening.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise specifically claimed.

Reference will now be made in detail to the present exemplary embodiments of the invention, non-limiting examples of which are illustrated in the accompanying drawings.

Figure 1:
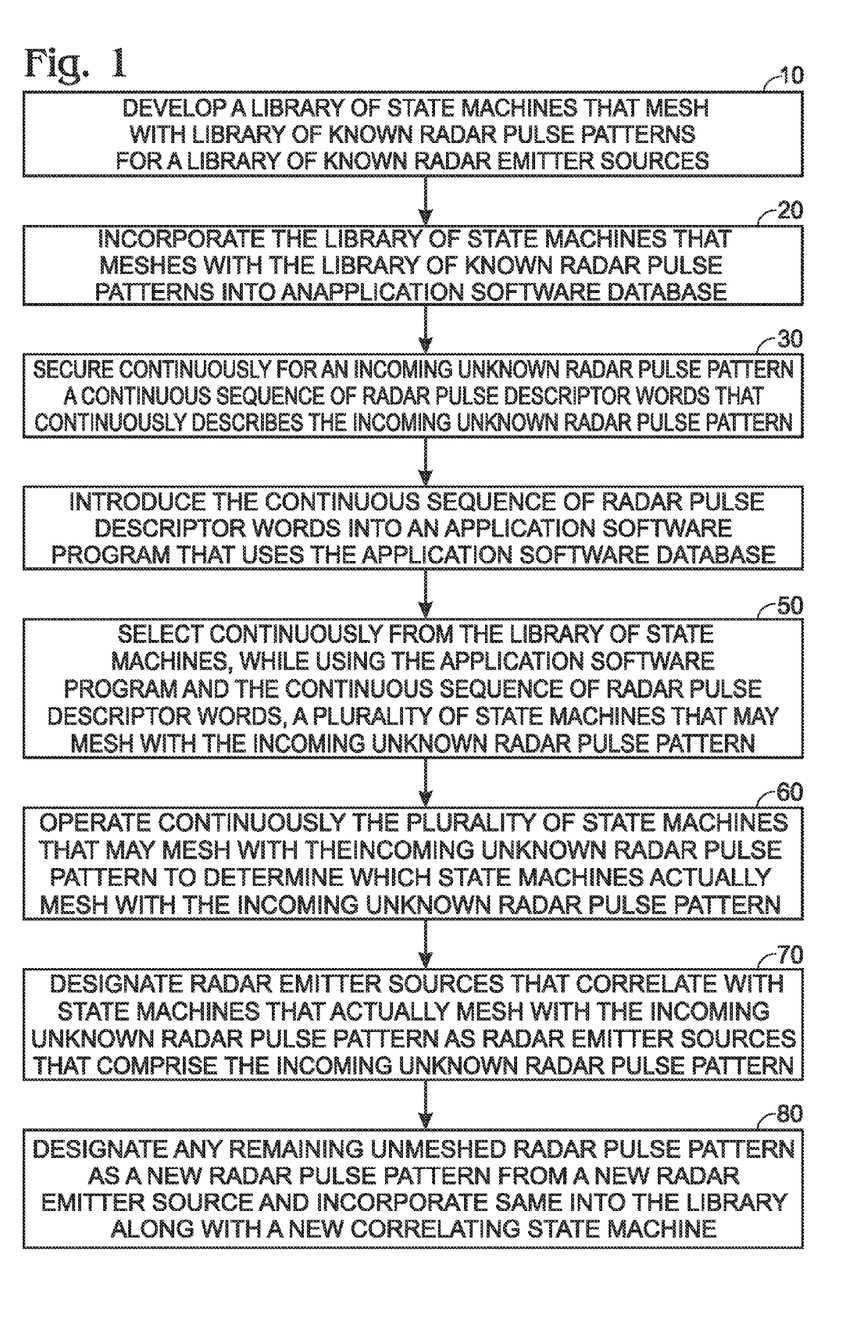
FIG. 1 shows a block text diagram illustrating a general methodological process flow of an incoming unknown radar pulse pattern deinterleaving and classification in accordance with the embodiments.

In a first instance, FIG. 1 shows a block text diagram of methodological process steps in accordance with a particular methodological embodiment for deinterleaving and classifying an incoming unknown radar pulse pattern. As is illustrated in FIG. 1, the methodological process steps in accordance with the embodiments includes 8 methodological process steps.

In accordance with FIG. 1 at reference numeral 10, a first methodological process step of the embodiments provides for developing a library of state machines that mesh with a library of known radar pulse patterns for a library of known radar emitter sources.

In general, the library of known radar emitter sources may be developed or generated from any of several existing databases of such radar emitter sources. Such databases of known radar emitter sources may include, but are not necessarily limited to, commercial databases and military related databases. In particular, the library of known radar emitter sources may be developed or generated from electronic warfare database sources. Particular examples of such electronic warfare database sources that may be pertinent within the context of the embodiments include the Electronic Warfare Integrated Reprogramming Database (EWIRDB) and the Next Generation EWIRDB (NGES). Either of the foregoing databases is available and may be accessed for purposes of developing a library of known radar emitter sources that provides a corresponding library of known radar pulse patterns from which may be developed a library of state machines that mesh with the library of known radar pulse patterns for the library of known radar emitter sources.

As a more specific example within the context of the foregoing library of known radar emitter sources, the library of known radar emitter sources may include, but is not necessarily limited to known radar emitter sources that provide the following radar pulse pattern types: (1) pulse repetition interval (PRI) staggered radar pulse pattern radar emitter sources, both with and without frequency hopping, variable pulse duration (PD) and frequency modulation on pulse (FMOP); (2) pulse repetition interval (PRI) dwell and switch radar pulse pattern radar emitter sources with and without radio frequency hopping, variable pulse duration (PD) and frequency modulation on pulse (FMOP); (3) sinusoidially modulated radio frequency and pulse repetition interval (PRI) radar pulse pattern radar emitter sources with and without variable pulse duration (PD) and frequency modulation on pulse (FMOP); and (4) constant radio frequency pulse repetition interval (PRI) and pulse duration (PD) radar pulse pattern radar emitter sources with or without frequency modulation on pulse (FMOP). Also considered within the context of the embodiments are radar emitter sources whose radar pulse patterns may be characterized within the context of alternative characteristics and parameters, such as but not limited to scan type and scan polarity characteristics and parameters.

Overall, it is estimated that at least several thousand radar emitter sources may be included within the library of radar emitter sources.

In accordance with FIG. 1 at reference numeral 20, the library of state machines that mesh with the library of known radar pulse patterns for the library of known radar emitter sources is incorporated into an application software database. As will be discussed in greater detail below, the application software database is used in conjunction with an application software program that: (1) evaluates sequential pulse descriptor words for an unknown incoming radar pulse pattern; and (2) selects relevant state machines that may mesh with the unknown incoming radar pulse pattern.

Within the instant embodiment, the application software database into which is incorporated the library of state machines that mesh with the library of known radar pulse patterns for the library of known radar emitter sources may be provided using any of several commercially available application software databases or custom application software databases.

Figure 2:
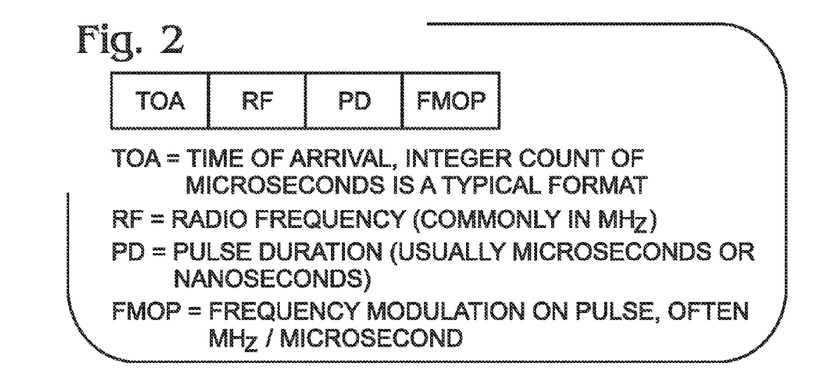
FIG. 2 shows a schematic diagram illustrating a pulse descriptor word (PDW) format for describing a portion of an incoming unknown radar pulse pattern in accordance with the embodiments.

In accordance with FIG. 1 at reference numeral 30, a continuous stream of radar pulse descriptor words (PDWs) for an incoming unknown radar pulse pattern that may be received by a particular target is secured continuously. For reference purposes, an example of a particular radar pulse descriptor word (PDW) format is shown in FIG. 2. As is illustrated in FIG. 2, the radar pulse descriptor word (PDW) format includes a minimum of four fields. The particular fields include, but are not limited to: (1) time of arrival (TOA); (2) radio frequency (RF); (3) pulse duration (PD); and (4) frequency modulation on pulse (FMOP). A particular pulse descriptor word (PDW) in accordance with the embodiments is not intended to be limited to a pulse descriptor word (PDW) as is illustrated within the context of the format of FIG. 2.

Pulse descriptor words (PDWs) are also discussed in greater detail within the context of a discussion of a pulse pattern descriptor language (PPDL) for a particular radar pulse pattern, as is also discussed in greater detail below.

In accordance with FIG. 1 at reference numeral 40, the continuous sequence of pulse descriptor words (PDWs) that is secured continuously for the incoming unknown radar pulse pattern is introduced into the application software program that uses the application software database into which is incorporated the library of state machines that mesh with the library of known radar pulse patterns for the library of known radar emitter sources.

In accordance with FIG. 1 at reference numeral 50, the application software program selects continuously from the library of state machines, based upon the application software program programming characteristics and the continuous sequence of radar pulse descriptor words (PDWs), a plurality of state machines that may mesh with the incoming unknown radar pulse pattern. As is understood by a person skilled in the art, this particular determination and selection of state machines is made by correlating: (1) major features of the pulse descriptor words (PDWs) with; (2) major correlating features of the particular state machines within the library of state machines. Thus, this particular correlation may plausibly involve a comparison of pulse descriptor words (PDWs) with pattern description record types that are used to define and develop the library of state machines. Such pattern description record types may also be expressed within the context of a pulse pattern descriptor language (PPDL).

Within the context of continuously selecting the plurality of state machines that may mesh with the incoming unknown radar pulse pattern, a complete range of parameter values specified in a pulse pattern descriptor language (PPDL) for each state machine (e.g. including but not limited to a complete range of valid values for RF, PRI, PD, FMOP etc) is preferably considered. To that end, each state machine is loaded into the library of state machines with a key value comprised of these ranges of parameter values, and a spatial query is used to rapidly identify which state machine(s) should be instantiated for the incoming pulse descriptor words (PDWs).

In accordance with FIG. 1 at reference numeral 60, the plurality of state machines that may mesh with the incoming unknown radar pulse pattern is operated simultaneously and continuously with respect to the incoming unknown radar pulse pattern to determine which state machines within the plurality of state machines that may mesh with the incoming unknown radar pulse pattern actually do in fact mesh with the incoming unknown radar pulse pattern. This particular aspect of the embodiment is illustrated in greater detail in FIG. 3.

Figure 3:
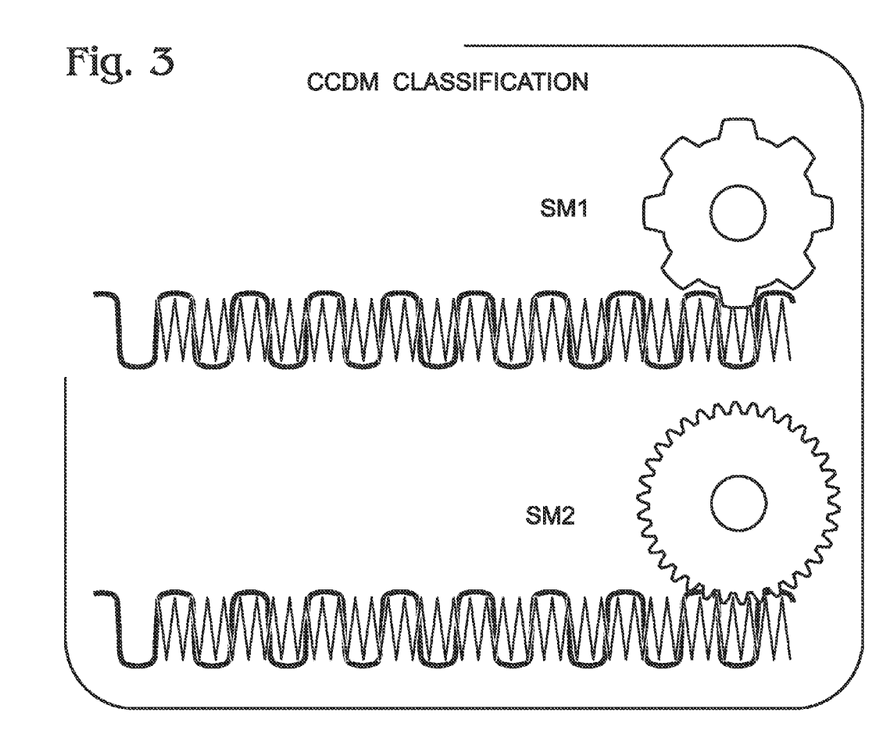
FIG. 3 shows a conceptual schematic diagram of a plurality of state machines simultaneously operating upon a single complex incoming unknown radar pulse pattern in accordance with the embodiments.

As is illustrated in FIG. 3, a particular first state machine SM1 having a detection and meshing capability for a broad periodicity of an incoming unknown radar pulse pattern is meshed with a broader periodicity pattern within a complex incoming unknown radar pulse pattern. In addition, and also within FIG. 3, an additional second state machine SM2 having a detection and meshing capability for a reduced periodicity pattern within the complex incoming unknown radar pulse pattern is simultaneously operated upon the same complex incoming unknown radar pulse pattern. Thus, as is illustrated within the schematic diagram of FIG. 3, the first (i.e., upper) state machine SM1 and the second (i.e., lower) state machine SM2 operate upon and mesh with different portions of the same complex incoming unknown radar pulse pattern. Within FIG. 3, this particular type of classification is designated as a concurrent classification and deinterleaving machine (CCDM) classification.

As is further understood by implication within FIG. 3, all of the radar pulse pattern characteristics of the complex incoming unknown radar pulse pattern are accommodated and meshed completely by the first state machine SM1 and the second state machine SM2. Thus, within FIG. 3 there is no remaining portion of the complex incoming unknown radar pulse pattern that is not meshed with and detected by the first state machine SM1 and the second state machine SM2.

In accordance with FIG. 1 at reference numeral 70, the known radar emitter sources that correlate with the state machines that actually mesh with the complex incoming unknown radar pulse pattern are designated as radar emitter sources that comprise the complex incoming unknown radar pulse pattern.

Finally, in accordance with FIG. 1 at reference numeral 80, any remaining unmeshed radar pulse pattern (i.e., of sufficient length to provide a presumed complete representation of a radar emitter source that correlates with the remaining unmeshed radar pulse pattern) from the complex incoming unknown radar pulse pattern is designated as a "new" radar pulse pattern (i.e., as defined above) and incorporated into the library of known radar pulse patterns and the corresponding library of known radar emitter sources, along with a new correlating state machine.

Thus, as described within the foregoing description, the embodiments in a first instance provide a method comprising a series of methodological process steps for deinterleaving and classifying an unknown incoming radar pulse pattern into a plurality of known radar emitter sources that comprise the unknown incoming radar pulse pattern. Such a deinterleaving and classifying is effected by: (1) securing a series of pulse descriptor words (PDWs) for the incoming unknown radar pulse pattern; (2) using the series of pulse descriptor words (PDWs) for selecting a plurality of state machines that may mesh with the incoming unknown radar pulse pattern; (3) operating the plurality of state machines that may mesh with the incoming unknown radar pulse pattern to determine state machines that actually do mesh with the incoming unknown radar pulse pattern; and (4) designating radar emitter sources that correlate with state machines that do mesh with incoming unknown radar pulse pattern as radar emitter sources that comprise the incoming unknown radar pulse pattern.

Figure 4:
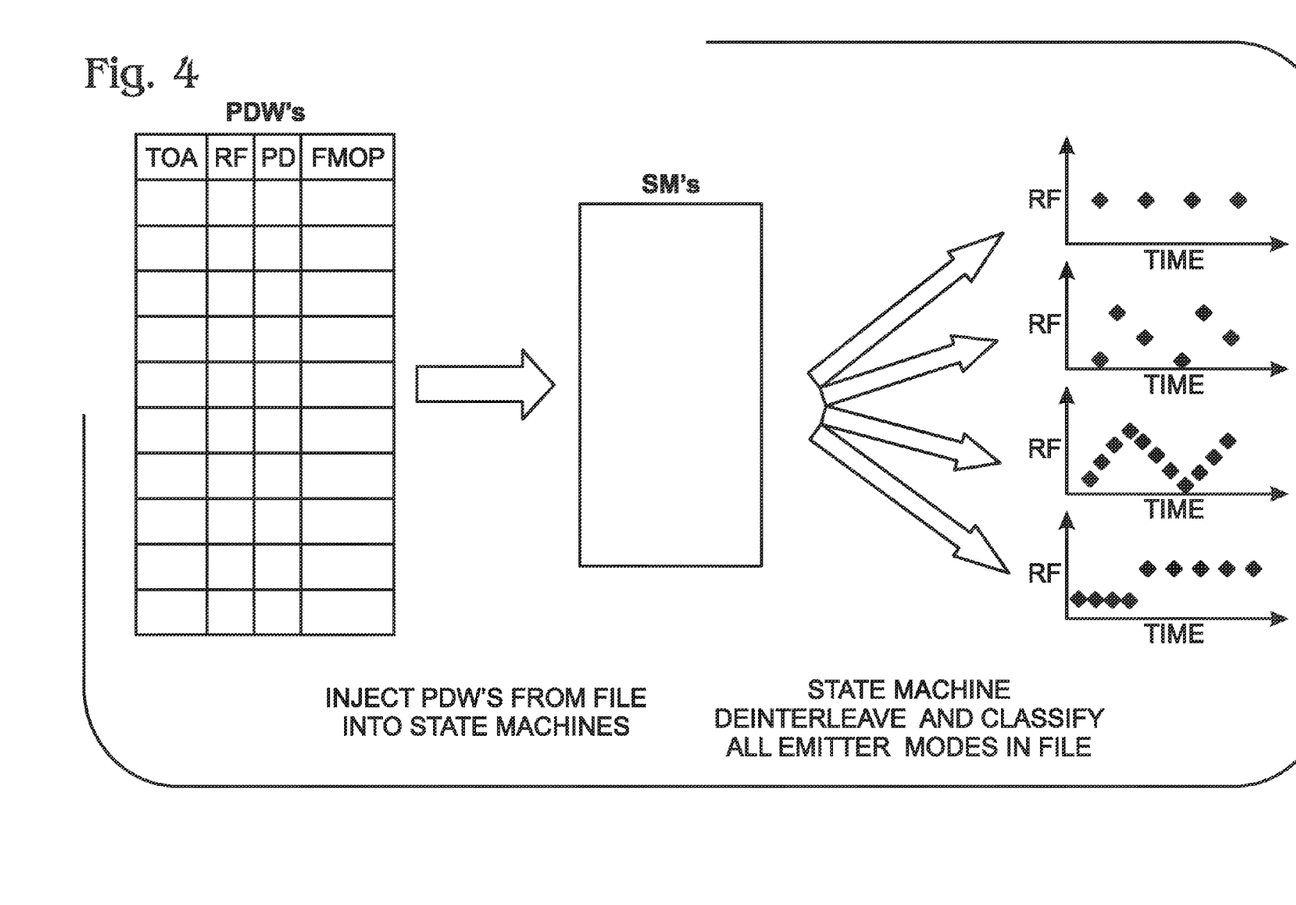
FIG. 4 shows in schematic diagram format the generalized deinterleaving and classification methodology for an incoming unknown radar pulse pattern in accordance with the embodiments.

The foregoing summary of the instant embodiment is illustrated graphically in FIG. 4, which in a first instance illustrates a pulse descriptor word (PDW) format in accordance with FIG. 2. A continuous plurality of pulse descriptor words (PDWs) that are in the pulse descriptor word (PDW) format is injected into a plurality of state machines (SMs) that deinterleave and classify most, if not all, radar emitter sources that comprise an incoming unknown radar pulse pattern which is described by the continuous plurality of pulse descriptor words (PDWs).

Figure 5A:
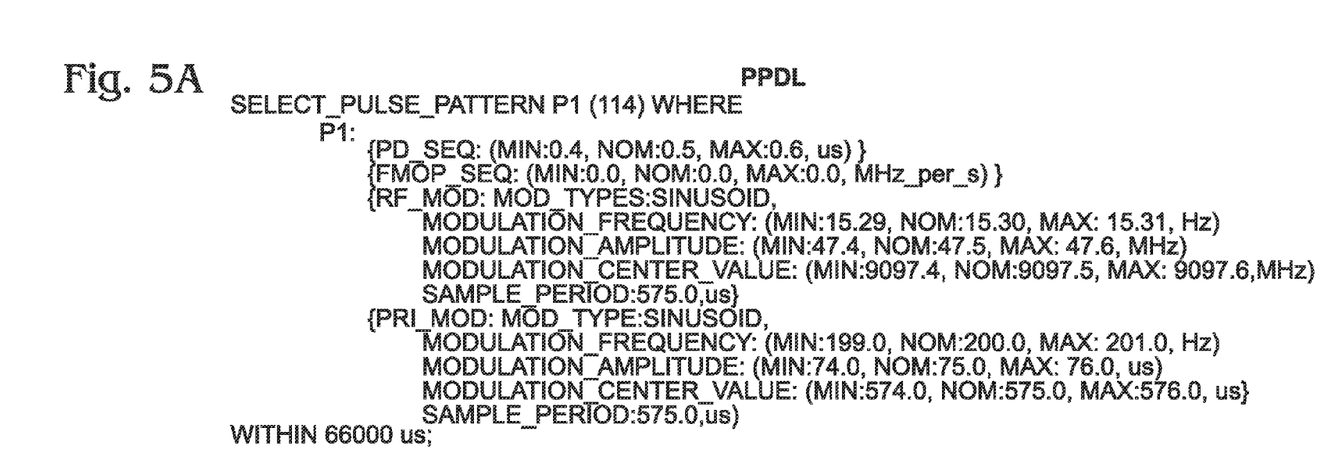
FIG. 5A to FIG. 5D show a series of schematic text diagrams illustrating a pulse pattern description language (PPDL) that may be used in accordance with the embodiments for describing a known radar pulse pattern from a known radar emitter source in accordance with the embodiments.

In order to facilitate the objectives of the embodiments, the embodiment also contemplates a pulse pattern descriptor language (PPDL) as is illustrated within FIG. 5A that is used to describe the pulse patterns that a radar emitter source may potentially emit. The pulse pattern descriptor language (PPDL) is a fully machine readable radar emitter source description language that is defined by EBNF (Extended Backus-Naur Form). This particular pulse pattern descriptor language (PPDL) may be represented textually or graphically.

Within the context of the pulse pattern descriptor language (PPDL), modern radar apparatus often produce radar pulse patterns that may be very difficult to describe and capture in databases since the radar pulse patterns are produced by computer software that may alter the radar pulse pattern based on changes in the environment within which a radar apparatus is operating. For example, a radar apparatus may initially emit a radar pulse pattern that includes a pulse rate of 50 radar pulses per second, but increase the pulse rate to 100 radar pulses per second if a target ventures within a certain arbitrary distance with respect to the radar apparatus. The radar apparatus may plausibly alternatively change: (1) a radio frequency utilized; (2) a pulse duration within a radar pulse pattern; or (3) a type of modulation utilized, in response to: (a) a target proximity; (b) a background electronics clutter; or (c) other factors, within the radar apparatus environment. The design of pulse pattern descriptor language (PPDL) attempts to capture and represent the various foregoing factors (and also other unenumerated factors) that may provide variability of a radar pulse pattern as a function of a target environment.

Many modern radar apparatus include a queue of radar pulse pattern "templates" that are scheduled for transmission from a radar apparatus. Each template may include a set of hardware coefficients that determine radio frequency duration and modulation characteristics for a radar pulse pattern that is intended to be broadcast from a radar apparatus. The templates are assembled in a "broadcast schedule" and a radar apparatus system clock forwards each template to a radar apparatus transmitter at an appropriate time, or an appropriate time interval. Many radar apparatus may, in response to a change in environmental conditions or target conditions, change a "regularly scheduled broadcast schedule" of radar pulse patterns to a different broadcast schedule of radar pulse patterns. Such a different broadcast schedule may be effected: (1) by simply removing specific radar pulse pattern templates from the broadcast queue and replacing them with new and different radar pulse pattern templates; or (2) by inserting new radar pulse pattern templates interposed between existing radar pulse pattern templates that are already in a queue.

The pulse pattern descriptor language (PPDL) has two language features (i.e., a PULSE INSERTION clause and a PULSE SUBSTITUTION clause) that specifically address the foregoing environmentally induced variability of radar pulse patterns, and these features allow the pulse pattern descriptor language (PPDL) to describe environmentally induced radar pulse pattern variability behavior that may in principle appear conceptually simple, but (purely in terms of intercepted radar pulse pattern pulses) in actuality seems random or excessively complex.

The pulse pattern descriptor language (PPDL) also includes other language features (arrays of numbers, CASE statements, parameter sets) that allow the pulse pattern descriptor language (PPDL) to readily represent parameters and variables such as but not limited to radar apparatus operator-selected frequencies. The pulse pattern descriptor language (PPDL) also accommodates radar pulse patterns derived from systems which randomly select an RF, PD, PRI or FMOP from a set of possible values. These kinds of radar pulse pattern variations are often difficult to characterize using alternative radar pulse pattern characterization methodology (i.e., typically software based) since alternative radar pulse pattern characterization methodology often assumes no variability in the foregoing parameters. Particular characterizations may plausibly be adjusted to account for variability in the foregoing parameters, but further evolution of radar apparatus capability has rendered even these adjusted characterizations inadequate to accurately represent many radar pulse patterns. The pulse pattern descriptor language (PPDL) is designed within the context of how a radar apparatus may actually operate, and to that end pulse pattern descriptor language (PPDL) is intended to properly characterize variations in many parameters in radar apparatus operation.

Figure 5B:
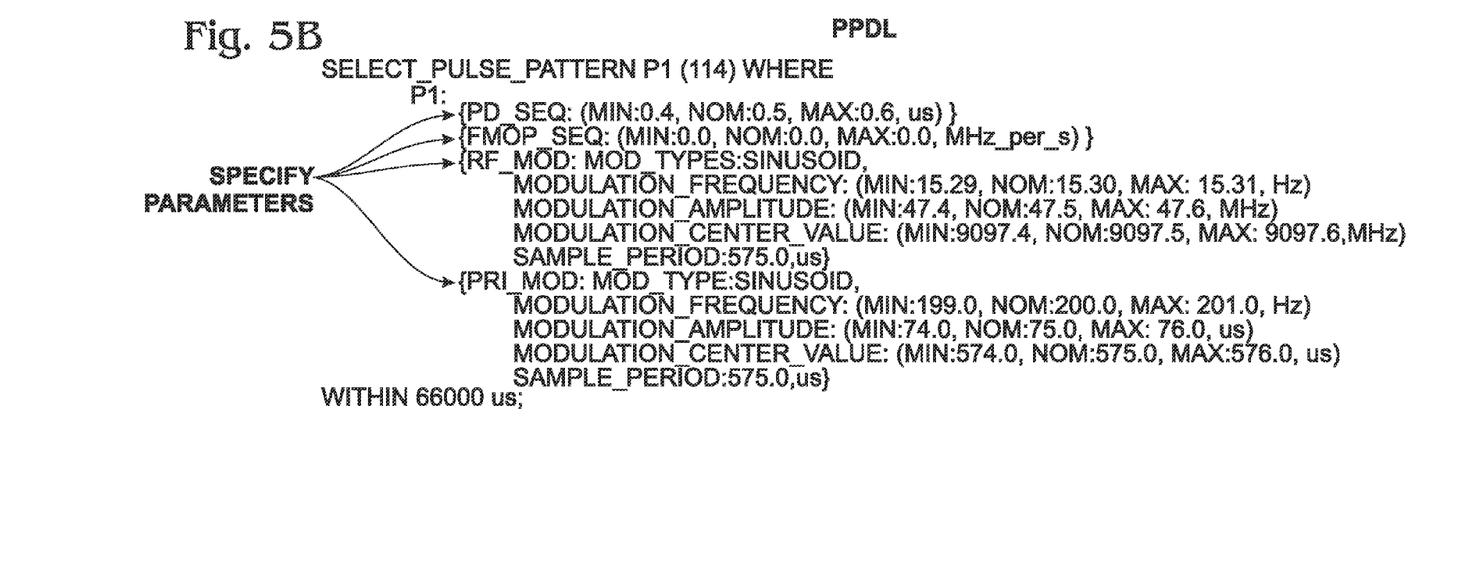

FIG. 5B shows specific parameters that may be specified within the context of a particular radar pulse pattern from a particular known radar emitter source within the context of the pulse pattern descriptor language (PPDL).

Figure 5C:
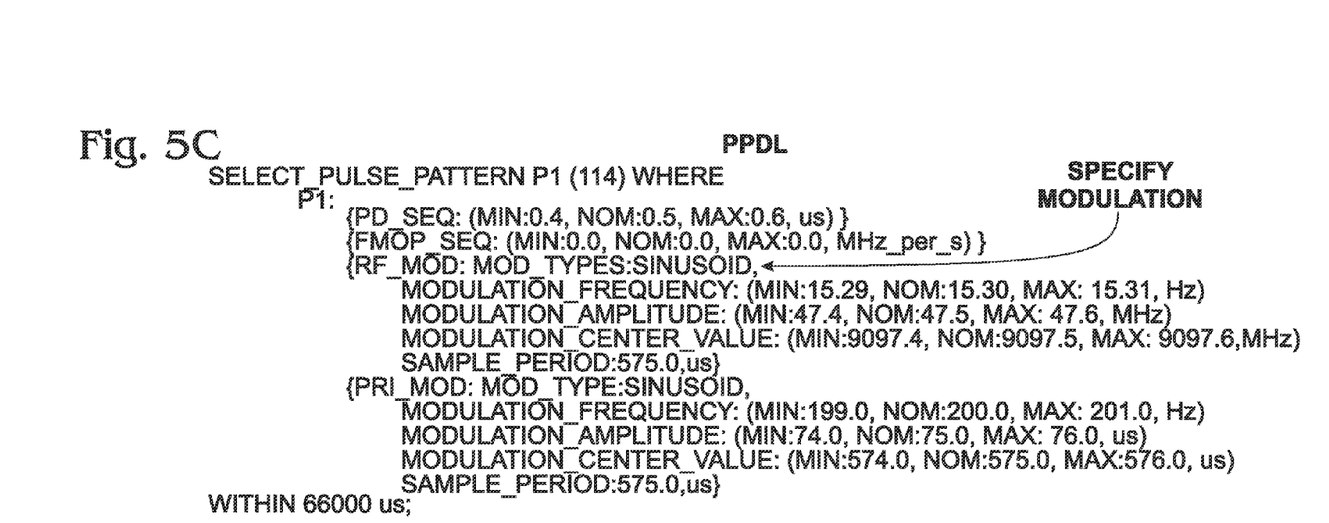

FIG. 5C shows a specific modulation type as sinusoidal for the particular radar pulse pattern for the particular known radar emitter source.

Figure 5D:
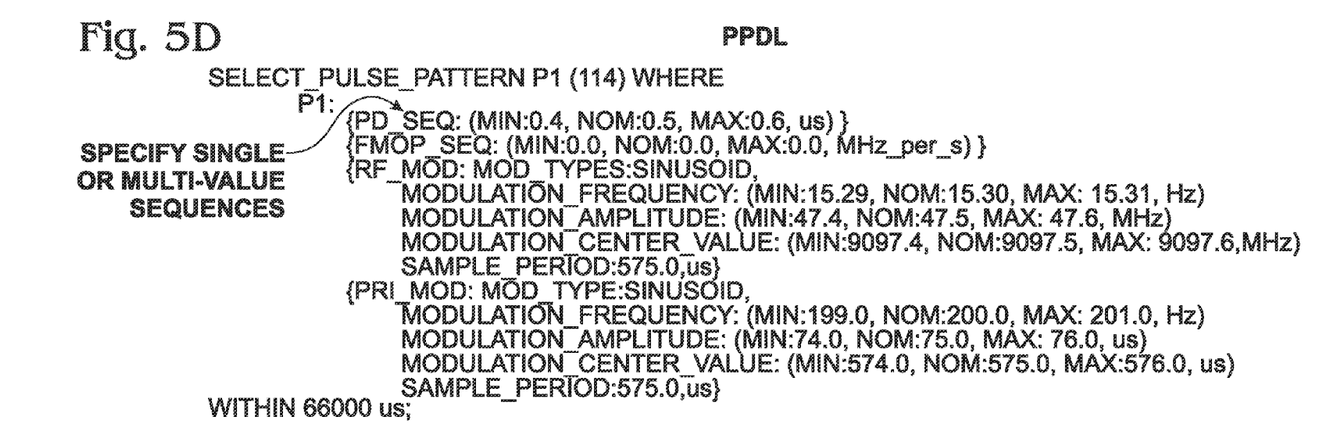

FIG. 5D shows for example single or multi value sequences for modulation of the particular radar pulse pattern for the particular radar emitter source.

FIG. 5A to FIG. 5D illustrate that the pulse pattern descriptor language (PPDL) may be directly compiled into a network of state machines that can detect or generate a specific radar pulse pattern, including variable radar pulse patterns, that may be used within a pulse descriptor word (PDW).

While the foregoing embodiment has been described within the context of a series of (preferably computer assisted) methodological process steps that is illustrated more specifically in FIG. 1 as reference numerals 10 to reference numeral 80, this particular embodiment is clearly not intended to so limit the invention to only a methodological embodiment. Rather, in addition to the methodological process steps in accordance with the foregoing embodiment as illustrated in FIG. 1, the embodiments also consider a related system for deinterleaving and classifying an incoming unknown radar pulse pattern and a related computer program product for deinterleaving and classifying the incoming unknown radar pulse pattern.

Within the context of such a system for deinterleaving and classifying an incoming unknown radar pulse pattern, the embodiment considers and contemplates a computer assisted system that may operate using any type of computer that is otherwise generally conventional in the data acquisition and processing art. Included in particular, but also not limiting are embedded computers, portable computers and mainframe computers. Such a computer assisted system provides for storage and operation of the application software database as well as the application software program that is used for executing the methodological process steps in accordance with the embodiments as illustrated in FIG. 1.

The embodiments also contemplate that a computer program product may also be considered within the context of an embodiment of the invention. Such a computer program product will typically include a computer readable medium encoded with a series of instructions appropriate to execute the methodological process steps in accordance with FIG. 1. Such a computer program product may comprise, but is not specifically limited to, hardware embodiments of a computer program product and software embodiments of a computer program product.

Overall, the embodiments consider that the method, the system and the computer program product in accordance with the invention are typically executed within the context of a system that includes an embedded computer so that field operation of the methodological embodiment is facilitated. Alternatively, the embodiments consider that the method, the system and the computer program product in accordance with the embodiments may be executed within the context of a field programmable gate array computer suitable for operation within the context of performance requirements for a tactical system. Such performance requirements may include, but are not limited to: (1) database requirements that provide that the library of known radar emitter sources may be efficiently constructed and timely updated in a tactical field environment; (2) state machine selection requirements that provide that particular state machines may be timely selected in a tactical field environment; and (3) concurrent classification and deinterleaving requirements that provide for timely execution of a concurrent classification and deinterleaving of a particular radar pulse pattern in a tactical field environment.

It will be understood by those skilled in the art that various modifications and variations can be made to the present embodiments without departing from the spirit and scope of the invention. Thus, the embodiments are intended as illustrative of the invention rather than limiting of the invention. There is no intention to limit the invention to the specific form or forms disclosed within the embodiments, but on the contrary, the intention is to cover all modifications, alternative constructions, and equivalents falling within the spirit and scope of the invention, as defined in the appended claims. Thus, it is intended that the present invention cover the modifications and variations of the embodiments provided they come within the scope of the appended claims and their equivalents.

What is claimed is:

1. A method, run on a processor, for deinterleaving and classifying a radar pulse pattern comprising:
developing a library of state machines for a library of known radar pulse patterns for a library of known radar emitter sources;
securing continuously for an incoming unknown radar pulse pattern a sequence of pulse descriptor words that describes the incoming unknown radar pulse pattern;
determining continuously from the library of state machines, using one or more of the pulse descriptor words within the sequence of pulse descriptor words, a plurality of state machines that may mesh with the incoming unknown radar pulse pattern;
operating continuously and simultaneously the plurality of state machines that may mesh with the incoming unknown radar pulse pattern to determine which state machines from the plurality of state machines actually mesh with the incoming unknown radar pulse pattern; and
designating from the state machines that actually mesh with the incoming unknown radar pulse pattern the corresponding known radar emitter sources as comprising the incoming unknown radar pulse pattern.

2. The method of claim 1 wherein the method comprises a computer assisted method.

3. The method of claim 1 wherein the library of state machines and the corresponding known radar emitter sources are described using a pulse pattern descriptor language.

4. The method of claim 3 wherein the pulse pattern descriptor language is a machine readable language.

5. The method of claim 1 further comprising designating any remaining unmeshed incoming unknown radar pulse pattern as a new radar pulse pattern.

6. The method of claim 5 further comprising entering the new radar pulse pattern as a new radar emitter source with a new state machine into the library of known state machines that mesh with the library of known radar pulse patterns for the library of known radar emitter sources.

7. The method of claim 1 wherein the selecting continuously from the library of state machines the plurality of state machines that may mesh with the incoming unknown radar pulse pattern considers a range of parameter values specified in a pulse pattern descriptor language for each state machine within the library of state machines.

8. The method of claim 1 wherein the library of state machines is incorporated into an application software database.

9. A system for deinterleaving and classifying a radar pulse pattern comprising:
a computer programmed to:
develop a library of state machines for a library of known radar pulse patterns for a library of known radar emitter sources;
secure continuously for an incoming unknown radar pulse pattern a sequence of pulse descriptor words that describes the incoming unknown radar pulse pattern;
determining continuously from the library of state machines, using one or more of the pulse descriptor words within the sequence of pulse descriptor words, a plurality of state machines that may mesh with the incoming unknown radar pulse pattern;
operate continuously and simultaneously the plurality of state machines that may mesh with the incoming unknown radar pulse pattern to determine which state machines from the plurality of state machines actually mesh with the incoming unknown radar pulse pattern; and
designate from the state machines that actually mesh with the incoming unknown radar pulse pattern the corresponding known radar emitter sources as comprising the incoming unknown radar pulse pattern.

10. The system of claim 9 wherein the library of state machines and the corresponding known radar emitter sources are described using a pulse pattern descriptor language.

11. The system of claim 10 wherein the pulse pattern descriptor language is a machine readable language.

12. The system of claim 9 wherein the computer is further programmed to designate any remaining unmeshed incoming unknown radar pulse pattern as a new radar pulse pattern.

13. The system of claim 12 wherein the computer is further programmed to enter the new radar pulse pattern as a new radar emitter source with a new state machine into the library of known state machines that mesh with the library of known radar pulse patterns for the library of known radar emitter sources.

14. The system of claim 9 wherein when selecting continuously from the library of state machines the plurality of state machines that may mesh with the incoming unknown radar pulse pattern considers a range of parameter values specified in a pulse pattern descriptor language for each state machine within the library of state machines.

15. The system of claim 9 wherein the library of state machines is incorporated into an application software database.

16. A computer program product for deinterleaving and classifying a radar pulse pattern comprising:
a tangible machine readable medium encoded with instructions to:
develop a library of state machines for a library of known radar pulse patterns for a library of known radar emitter sources;
secure continuously for an incoming unknown radar pulse pattern a sequence of pulse descriptor words that describes the incoming unknown radar pulse pattern;
determine continuously from the library of state machines, using one or more of the pulse descriptor words within the sequence of pulse descriptor words, a plurality of state machines that may mesh with the incoming unknown radar pulse pattern;
operate continuously and simultaneously the plurality of state machines that may mesh with the incoming unknown radar pulse pattern to determine which state machines from the plurality of state machines actually mesh with the incoming unknown radar pulse pattern; and
designate from the state machines that actually mesh with the incoming unknown radar pulse pattern the corresponding known radar emitter sources as comprising the incoming unknown radar pulse pattern.

17. The computer program product of claim 16 wherein the library of state machines and the corresponding known radar emitter sources are described using a pulse pattern descriptor language.

18. The computer program product of claim 17 wherein the pulse pattern descriptor language is a machine readable language.

19. The computer program product of claim 16 wherein the computer program product further contains instructions to designate any remaining unmeshed incoming unknown radar pulse pattern as a new radar pulse pattern.

20. The computer program product of claim 19 wherein the computer program product further contains instructions to enter the new radar pulse pattern as a new radar emitter source with a new state machine into the library of known state machines that mesh with the library of known radar pulse patterns of the library of known radar emitter sources.

21. The computer program product of claim 16 wherein when selecting continuously from the library of state machines a plurality of state machines that may mesh with the incoming unknown radar pulse pattern the computer program product considers a range of parameter values specified in a pulse pattern descriptor language for each state machine within the library of state machines.

22. The computer program product of claim 16 wherein the library of state machines is incorporated into an application software database within the computer program product.

* * * * *